United States Patent
Nickels, Jr. et al.

(10) Patent No.: US 7,699,566 B2
(45) Date of Patent: Apr. 20, 2010

(54) TOOL CHUCK WITH SLEEVE AND CLUTCH MECHANISM

(75) Inventors: Richard C. Nickels, Jr., Hampstead, MD (US); John E. Buck, Cockeysville, MD (US); Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/495,149

(22) Filed: Jun. 30, 2009

(65) Prior Publication Data

US 2009/0261538 A1 Oct. 22, 2009

Related U.S. Application Data

(62) Division of application No. 11/398,537, filed on Apr. 6, 2006, now abandoned.

(60) Provisional application No. 60/672,076, filed on Apr. 18, 2005.

(51) Int. Cl.
  *B23B 31/26* (2006.01)
  *B23B 31/38* (2006.01)

(52) U.S. Cl. .................. 408/9; 408/124; 408/240; 279/62; 279/125; 279/140; 279/902

(58) Field of Classification Search .................. 408/9, 408/124, 240; 279/60–63, 125, 140, 902; *B23B 31/26, B23B 31/38*
See application file for complete search history.

(56) References Cited

U.S. PATENT DOCUMENTS

| | | | | |
|---|---|---|---|---|
| 4,317,578 A | * | 3/1982 | Welch | 279/60 |
| 4,323,324 A | * | 4/1982 | Eberhardt | 408/124 |
| 4,460,296 A | * | 7/1984 | Sivertson, Jr. | 408/124 |
| 4,669,932 A | * | 6/1987 | Hartley | 408/239 R |
| 4,682,918 A | | 7/1987 | Palm | |
| 4,915,555 A | * | 4/1990 | Smothers | 408/240 |
| 4,958,840 A | | 9/1990 | Palm | |
| 5,011,343 A | * | 4/1991 | Saban et al. | 408/240 |
| 5,125,673 A | | 6/1992 | Huff et al. | |
| 5,927,914 A | * | 7/1999 | Mack et al. | 408/240 |
| 6,173,972 B1 | | 1/2001 | Temple-Wilson et al. | |
| 6,296,257 B1 | | 10/2001 | Huff et al. | |
| 7,328,904 B2 | | 2/2008 | Schell et al. | |
| 7,491,020 B2 | | 2/2009 | Gehret et al. | |
| 2004/0055432 A1 | | 3/2004 | Sasaki | |
| 2006/0066063 A1 | | 3/2006 | Nickels, Jr. et al. | |
| 2006/0192351 A1 | | 8/2006 | Mack | |

(Continued)

*Primary Examiner*—David P Bryant
*Assistant Examiner*—Eric A Gates
(74) *Attorney, Agent, or Firm*—Capitol City TechLaw

(57) ABSTRACT

A tool chuck may include a chuck body defining a longitudinal axis. A sleeve may be mounted on the chuck body and axially fixed relative to the chuck body. A clutch part may be provided on the sleeve. The clutch part may interact with a cooperating clutch part mounted on the power driver housing. The cooperating clutch part may be mounted on the power driver housing for movement between a first axial position in which the chuck body is rotatable together with the sleeve, and a second axial position in which the chuck body is rotatable relative to the sleeve to actuate the tool chuck. The chuck body may be rotatable in a first direction to actuate the tool chuck up to a first torque threshold, and rotatable in a second direction to actuate the tool chuck up to a second, different torque threshold.

12 Claims, 11 Drawing Sheets

U.S. PATENT DOCUMENTS

| | | |
|---|---|---|
| 2006/0233618 A1 | 10/2006 | Puzio et al. |
| 2006/0233621 A1 | 10/2006 | Schell et al. |
| 2007/0068692 A1 | 3/2007 | Puzio |
| 2007/0132196 A1 | 6/2007 | Puzio et al. |
| 2007/0158086 A1 | 7/2007 | Puzio |
| 2007/0170664 A1 | 7/2007 | Puzio et al. |
| 2007/0170665 A1 | 7/2007 | Puzio et al. |
| 2007/0187908 A1 | 8/2007 | Puzio |
| 2009/0016834 A1 | 1/2009 | Scrimshaw et al. |

* cited by examiner

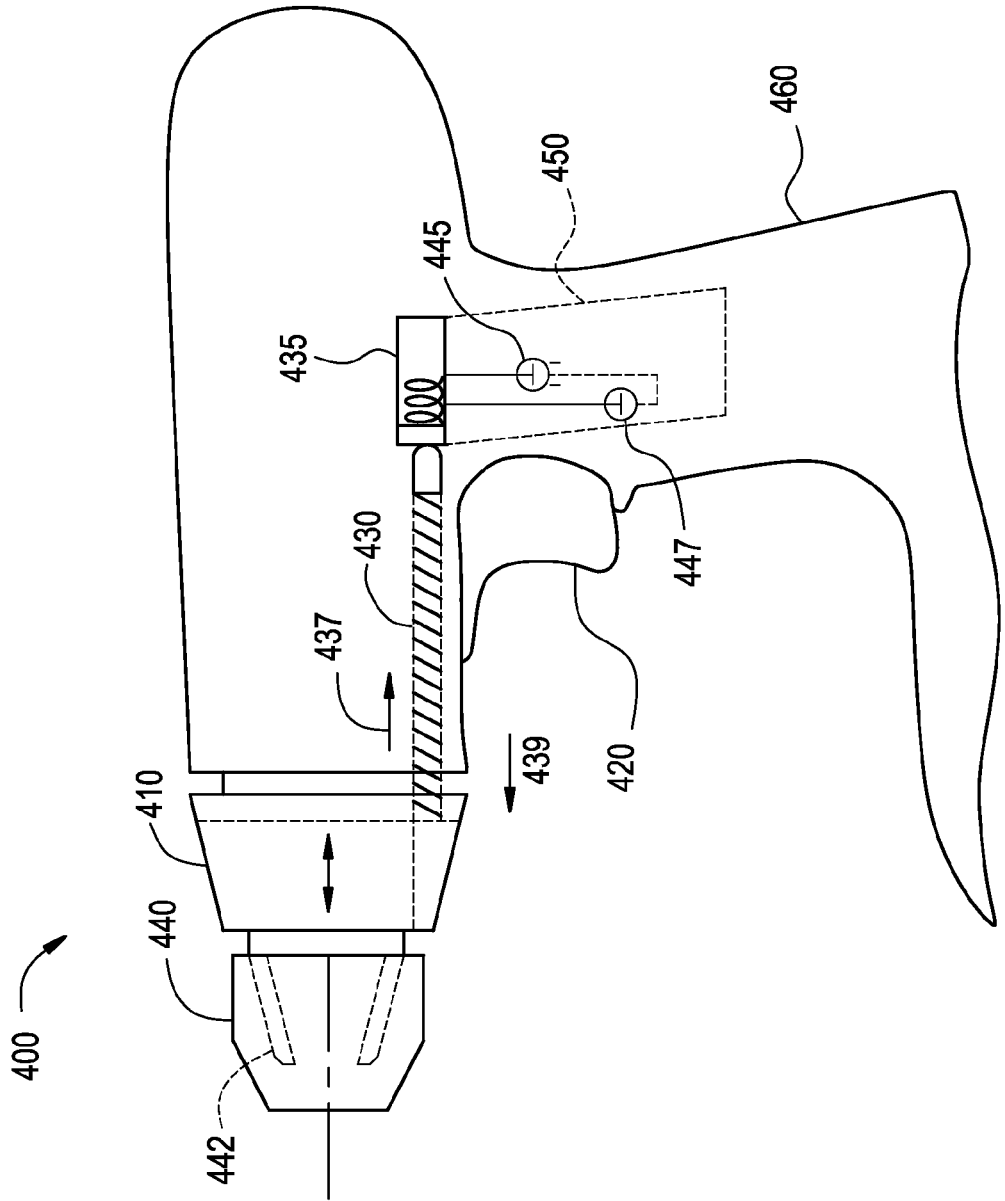

TOOL CHUCK WITH SLEEVE AND CLUTCH MECHANISM

CROSS-REFERENCE TO RELATED APPLICATIONS

This application is a divisional application of U.S. patent application Ser. No. 11/398,537, filed Apr. 6, 2006 now abandoned, which claims benefit under 35 USC §119(e) from U.S. Provisional Application No. 60/672,076, filed Apr. 18, 2005, the entire content of both of which are incorporated herein by reference.

This application is related to co-pending U.S. patent application Ser. No. 11/235,280, filed Sep. 27, 2005, the entire content of which is incorporated herein by reference.

BACKGROUND OF THE INVENTION

1. Field of the Invention

The present invention relates in general to tool chucks for attachment of accessories to power drivers.

2. Description of Related Art

A variety of tool chucks have been developed in which the chuck jaws may be opened and closed via a relative rotation between parts of the tool chuck. In some applications, the tool chuck may include a sleeve that is rotatable manually (with or without using a chuck key) to open and close the chuck jaws. In other applications, power from the power driver may be utilized to open and close the chuck jaws. For example, the tool chuck may be provided with a sleeve that is axially moveable to a position in which the sleeve is grounded (i.e., rotationally fixed) to the housing of the power driver. Thus, when the driver is powered up, a spindle of the driver (and consequently a chuck body) may rotate relative to the sleeve. The relative rotation between the spindle and the sleeve may open and close the chuck jaws.

Conventional keyless tool chucks are not without shortcomings. For example, the tightening or loosening torque applied during a chuck actuation process may vary depending on factors such as, for example, the firmness with which the operator manipulates the sleeve. On the one hand, if an operator manipulates the sleeve with a relatively high force, then a relatively high torque may be applied during the chuck actuation process. On the other hand, if an operator manipulates the sleeve with a relatively low force, then a relatively low torque may be applied during the chuck actuation process.

The inconsistent application of torque may lead to problems such as under-tightening and over-tightening of the tool chuck. When the tool chuck is under tightened, the accessory may slip relative to (and even inadvertently fall from) the tool chuck. When the tool chuck is over-tightened, it may be difficult to loosen the tool chuck to remove the accessory. Also, high speed impacts between transmission elements of the power driver may occur when the chuck jaws bottom out on the accessory (when tightening) or when the chuck jaws reach the full limit of travel (when loosening). In conventional power tool or other power devices, such high speed impacts may damage the transmission elements, since the torque applied during the chuck actuation process may be unlimited.

SUMMARY OF THE INVENTION

In an example embodiment, a tool chuck may include a chuck body defining a longitudinal axis. A sleeve may be mounted on the chuck body, such that the sleeve is rotatable relative to the chuck body and axially fixed in position relative to the chuck body. A clutch part may be provided on the sleeve. The clutch part may have a working surface to selectively engage with a cooperating clutch part. The working surface may face in a direction that is perpendicular to the longitudinal axis.

In another example embodiment, a power driver may include a housing. A tool chuck may be mounted for rotation relative to the housing. The tool chuck may include a chuck body defining a longitudinal axis, a sleeve mounted on the chuck body, such that the sleeve is rotatable relative to the chuck body and axially fixed in position relative to the chuck body, and a clutch part provided on the sleeve. A cooperating clutch part may be provided on the housing for movement relative to the housing between a first axial position in which the sleeve is rotatable with the chuck body, and a second axial position in which the cooperating clutch part engages with the clutch part provided on the sleeve.

In another example embodiment, a power driver may include a housing. A linkage may be provided on the housing and connected to a power switch. A tool chuck may be provided on the housing. The tool chuck may have a chuck body. A sleeve may be mounted on one of the chuck body and the housing. The sleeve may support a clutch part. The sleeve may be moveable relative to the housing between a first axial position in which the clutch part engages with a cooperating clutch part and the sleeve moves the linkage to actuate the power switch, and a second axial position in which clutch part disengages from the cooperating clutch part.

BRIEF DESCRIPTION OF THE DRAWINGS

The example embodiments of the present invention will become more fully understood from the detailed description below and the accompanying drawings, wherein like elements are represented by like reference numerals, which are given by way of illustration only and thus are not limiting of the example embodiments of the present invention.

FIG. 16 illustrates a clutch ring mechanism adapted as a user interface for controlling a power drill driver motor for accessory retention/disengagement.

DETAILED DESCRIPTION OF THE EXAMPLE EMBODIMENTS

I. Example Embodiment Depicted in FIGS. 1-4

Figure 1:
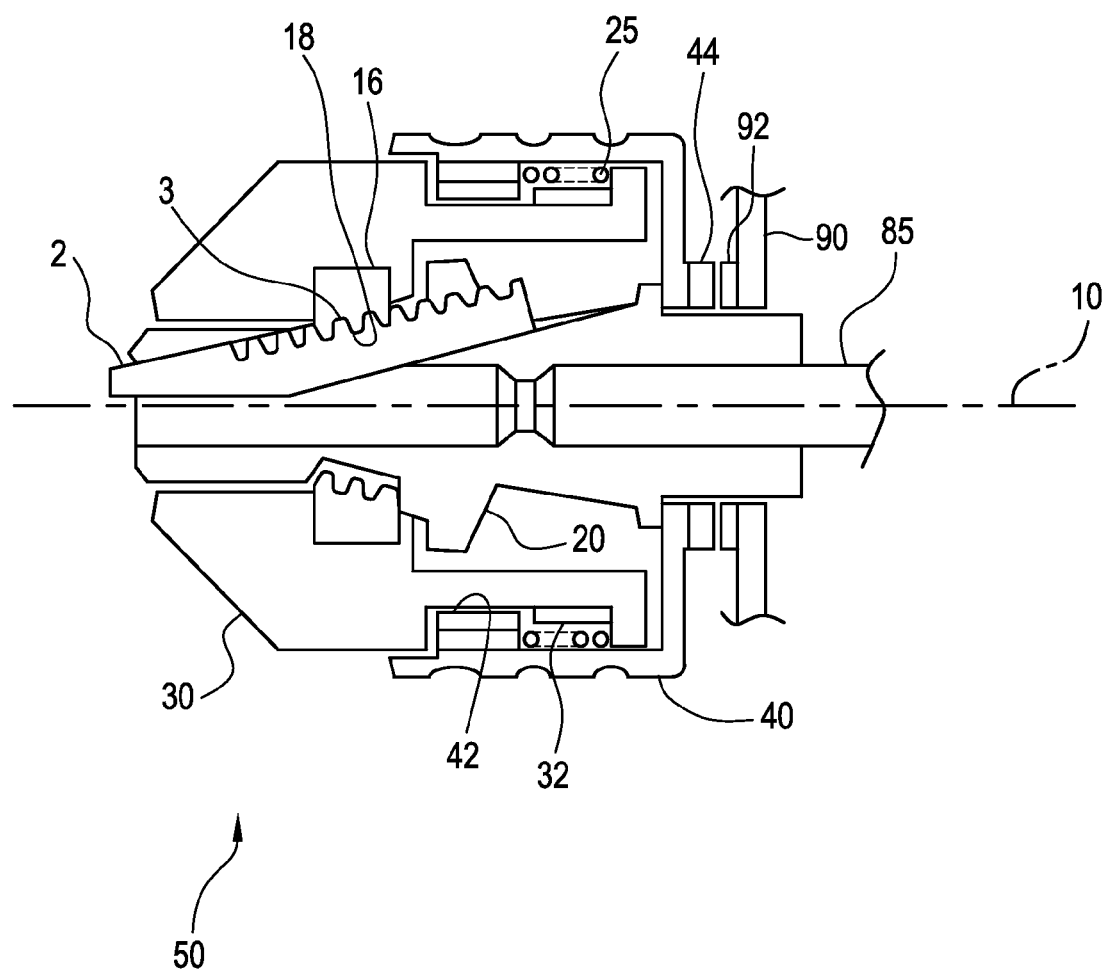
FIG. 1 is a schematic illustration of a tool chuck according to an example, non-limiting embodiment of the present invention.

FIG. 1 shows an example, non-limiting embodiment of a tool chuck 50 that may be actuated with uniform torque and without operator variability. The tool chuck 50 may be provided on a power driver (e.g., a drill) for holding an accessory (e.g., a drill bit). It will be appreciated, however, that the tool chuck 50 may be implemented on a variety of power drivers (other than drills) for holding a variety of accessories (other than drill bits).

A. Example Structure:

With reference to FIG. 1, the tool chuck 50 may include a chuck body 20. The rear end of the chuck body 20 may be fixedly mounted on a spindle 85 of a power driver. The forward end of the chuck body 20 may have passageways that slidably support a plurality of chuck jaws 2. The chuck jaws 2 may be inclined so that respective forward ends of the chuck jaws 2 converge toward an axis 10 of the chuck body 20. The chuck jaws 2 may have respective radially outward facing threads 3. For clarity of illustration, only a single chuck jaw 2 is depicted in FIG. 1.

In this example embodiment, the chuck jaws 2 may be characterized as "threaded" chuck jaws. That is, the chuck jaws 2 may be actuated (i.e., advanced and/or retracted) via the radially outward facing threads 3 interacting with radially inward facing threads 18 of a nut 16. However, the example embodiments of the present invention are not limited in this regard. For example, "pusher" jaws may be implemented and supported by the chuck body. Pusher jaws are well known in this art, and therefore a detailed discussion of pusher jaws is omitted herein for purposes of brevity. The example embodiments of the present invention may be implemented with a variety chuck jaw types that may be opened and closed through a relative rotation between tool chuck parts (e.g., a nut and a chuck body).

The chuck body 20 may support a front sleeve 30 and a rear sleeve 40. The front sleeve 30 and the rear sleeve 40 may be rotatable relative to each other. As will be discussed in more detail below, a clutch mechanism (inclusive of two cooperating clutch parts 32, 42) may be provided between the front sleeve 30 and the rear sleeve 40. The clutch mechanism may rotationally lock the front sleeve 30 and the rear sleeve 40 together up to a given torque threshold. Once the given torque threshold is reached, the clutch mechanism may give way (or slip) to limit the torque that may be applied during the chuck actuation process. Further, the clutch mechanism may be designed so that the given threshold for tightening the tool chuck may be less than the given threshold for loosening the tool chuck.

The front sleeve 30 may be supported so that it is axially fixed to the chuck body 20 and rotatable relative to the chuck body 20. The front sleeve 30 may fixedly carry the nut 16. In this example embodiment, the front sleeve 30 and the nut 16 may be separate and distinct elements to facilitate assembly of the tool chuck 50. It will be appreciated, however, that the front sleeve 30 and the nut 16 may be of a unitary, one-piece construction. The rear end of the front sleeve 30 may include the clutch part 32.

The rear sleeve 40 may be supported so that it is axially moveable relative to the chuck body 20 (and thus the front sleeve 30) between the axial forward position depicted in FIG. 1 and an axial rearward position. The rear sleeve 40 may also be rotatable relative to the chuck body 20. The forward end of the rear sleeve 40 may include the clutch part 42. The clutch part 42 may interact with the clutch part 32 of the front sleeve 30. The rear end of the rear sleeve 40 may include lugs 44. The lugs 44 may interact with cooperating lugs 92 of the power driver housing 90.

A compression spring 25 may be captured between the front sleeve 30 and the rear sleeve 40. The compression spring 25 may influence the rear sleeve 40 to the axial forward position shown in FIG. 1.

Figure 2:
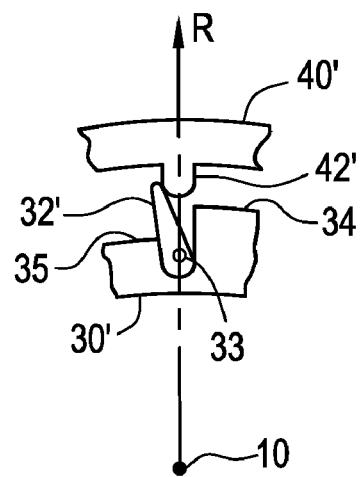
FIGS. 2-4 are schematic illustrations of example clutch mechanisms that may be implemented in the tool chuck of FIG. 1.
Figure 3:
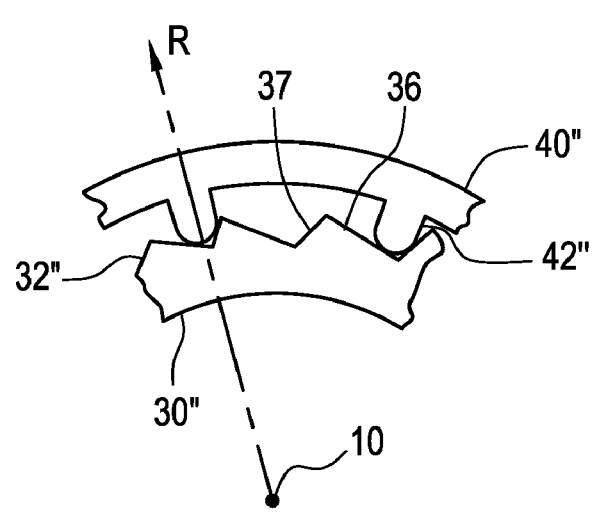
Figure 4:
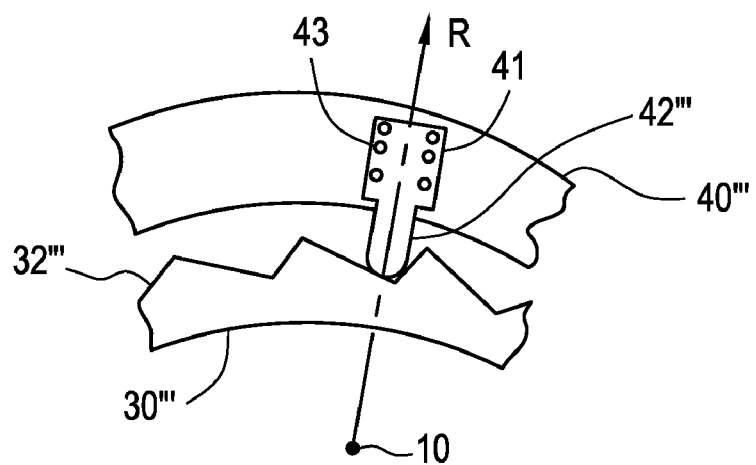

B. Example Clutch Mechanism:

Structural and functional aspects of the clutch mechanism may become more apparent with reference to FIGS. 2-4, which are partial sectional views (taken perpendicular to the axis 10) of example, non-limiting embodiments of the cooperating clutch parts that may be implemented in the tool chuck 50 of FIG. 1. In FIGS. 2-4, the rear sleeve is depicted in the axial rearward position so that the clutch parts may be operatively engaged. In this condition, one clutch part may be located radially inward of the other clutch part.

The cooperating clutch parts may include respective working surfaces. In this specification, the term "working surface" refers to the surface of the clutch part that may frictionally engage with the working surface of the cooperating clutch part. In FIGS. 2-4, the working surfaces of the clutch parts may face in directions that are perpendicular to the axis 10 of the tool chuck. That is, as shown in FIGS. 2-4, the working surfaces of the various clutch parts may face in directions that are parallel to the plane of the drawing sheet, while the axis 10 is perpendicular to the plane of the drawing sheet.

B(1). Example Clutch Mechanism of FIG. 2:

As shown in FIG. 2, the clutch part of the front sleeve 30' may be in the form of an arm 32', and the clutch part of the rear sleeve 40' may be in the form of a detent 42'. The arm 32' may be mounted on the front sleeve 30' via a pin 33 so that the arm 32' is pivotable about the pin 33. The front sleeve 30' may also include two shoulders 34, 35 flanking the arm 32' and limiting the pivot action of the arm 32' about the pin 33.

During a chuck actuation process (occasionally hereafter also referred to as a "chuck actuation mode"), and when the tool chuck 50 is not fully opened or closed (e.g., while the chuck jaws are still opening or closing), the arm 32' may abut against the detent 42', which in turn may influence the arm 32' to pivot about the pin 33 and abut against one of the shoulders 34, 35. At this time, the front sleeve 30' and the rear sleeve 40' may be rotationally locked together. When the tool chuck fully closes (with or without an inserted accessory) or fully opens, a rotational force applied by the arm 32' to the detent 42' may increase. Here, the rotational force may increase to a threshold at which the detent 42' may be driven in a radial outward direction (causing the rear sleeve 40' to elastically deform) so that the arm 32' may slide underneath and past the detent 42'. In this way, the clutch mechanism may give way (or slip), thereby limiting the torque that may be applied during the chuck actuation process.

The magnitude of the rotational force necessary to drive the detent 42' in a radial outward direction may be affected by, for example, the elastic properties of the material from which the rear sleeve 40' is fabricated and the degree to which the working surface of the arm 32' is inclined (or slanted) relative to a radial reference line R extending from the axis 10. Consider the incline of the working surface; the smaller the angle between the working surface and the radial reference line R, the greater the rotational force necessary to make the clutch mechanism slip. Put differently, the steeper the working surface relative to a circumferential reference line (which would be perpendicular to the radial reference line R), the greater the rotational force necessary to make the clutch mechanism slip.

As shown in FIG. 2, the shoulder 34 of the front sleeve 30' may be higher (in a radial direction) than the shoulder 35. Thus, as compared to the shoulder 34, the shoulder 35 may allow the arm 32' to pivot about the pin 33 to a greater extent (i.e., through a greater angular displacement) from the radial reference line R. Thus, when the arm 32' abuts against the shoulder 35 (as shown in FIG. 2), the working surface of the arm 32' may be inclined (relative to the radial reference line R) to a greater degree than when the arm 32' abuts against the shoulder 34. In this way, the rotational force (or torque threshold) causing the clutch mechanism slip in a first direction (i.e., when the detent 42' slides over the arm 32' abutted against the shoulder 35, as shown in FIG. 2) may be less than the rotational force (or torque threshold) causing the clutch mechanism slip in a second direction (i.e., when the detent 42' slides over the arm 32' abutted against the should 34). This torque threshold differential may be implemented so that a given torque threshold for the chuck tightening process may be less than a given torque threshold for the chuck loosening process.

Numerous modifications of the example clutch mechanism depicted in FIG. 2 may be readily apparent to those skilled in this art. For example, rather than being pivotable, the arm 32' may be cantilevered from the front sleeve 30' and elastically deformable. Here, the detent 42' may elastically bend the cantilevered arm 32' against one of the shoulders 34, 35 so that the detent 42' may slide over the cantilevered arm 32'. Since the shoulder 34 may be higher (in a radial direction) than the shoulder 35, the shoulder 35 may provide less support for the cantilevered arm 32'. In this way, the rotational force (or torque threshold) causing the clutch mechanism slip in a first direction (i.e., when the detent 42' elastically bends the cantilevered arm 32' toward the shoulder 35, as shown in FIG. 2) may be less than the rotational force (or torque threshold) causing the clutch mechanism slip in a second direction (i.e., when the detent 42' elastically bends the cantilevered arm 32' toward the shoulder 34).

B(2). Example Clutch Mechanism of FIG. 3:

As shown in FIG. 3, the clutch part of the front sleeve 30'' may be in the form of a raised feature 32'', and the clutch part of the rear sleeve 40'' may be in the form of a detent 42''. The raised feature 32'' may include two ramps 36, 37.

During a chuck actuation process, and when the tool chuck 50 is not fully opened or closed, the raised feature 32'' may abut against the detent 42'' so that the front sleeve 30'' and the rear sleeve 40'' may be rotationally locked together. When the tool chuck fully closes or fully opens, a rotational force applied by the raised feature 32'' to the detent 42'' may increase to a threshold at which the detent 42'' may be driven in a radial outward direction (causing the rear sleeve 40'' to elastically deform) so that the raised feature 32'' may slide underneath and past the detent 42''.

As shown in FIG. 3, a working surface of the ramp 36 may be inclined (relative to the radial reference line R) to a greater degree than a working surface of the ramp 37. In this way, the rotational force (or threshold torque) causing the clutch mechanism slip in a first direction (i.e., when the detent 42'' is driven in a radial outward direction via the working surface of the ramp 36) may be less than the rotational force (or threshold torque) causing the clutch mechanism slip in a second direction (i.e., when the detent 42'' is driven in a radial outward direction via the working surface of the ramp 37). This threshold torque differential may be implemented so that a given torque threshold for the chuck tightening process may be less than a given threshold for the chuck loosening process.

B(3). Example Clutch Mechanism of FIG. 4:

The example clutch mechanism of FIG. 4 is somewhat similar to the one depicted in FIG. 3 to the extent that the clutch part of the front sleeve 30''' may be in the form of a raised feature 32''' including two ramps. Differences are discussed below.

As shown in FIG. 4, the clutch part of the rear sleeve 40''' may be in the form of a detent 42''' that may be biased in a radial inward direction by a compression spring 43. The compression spring 43 and the detent 42''' may be received in a pocket 41 of the rear sleeve 40'''.

During a chuck actuation process, and when the tool chuck 50 is not fully opened or closed, the raised feature 32''' may abut against the protrusion 42''' so that the front sleeve 30''' and the rear sleeve 40''' may be rotationally locked together. When the tool chuck fully closes or fully opens, a rotational force applied by the raised feature 32''' to the protrusion 42''' may increase to a threshold at which the protrusion 42''' may be driven in a radial outward direction (and into the pocket 41) against the influence of the compression spring 43 so that the raised feature 32''' may slide underneath and past the detent 42'''. The compression spring 43 may then influence the detent 42''' to return to a radial inward position (as shown in FIG. 4). In this example embodiment, the clutch mechanism may slip without the rear sleeve 40''' experiencing any elastic deformation.

As in the previous example embodiments, a threshold torque differential may be implemented so that a given torque threshold for the chuck tightening process may be less than a given threshold for the chuck loosening process.

C. Example Operation:

The tool chuck 50 may operate differently depending on the axial position of the rear sleeve 40. When the rear sleeve 40 is in the axial forward position, as shown in FIG. 1, the power driver may be operated in a normal operating mode. Here, the rear sleeve 40 may be rotatable relative to the front sleeve 30 since the clutch parts 32, 42 may be disengaged (i.e., the clutch mechanism is inactive). The rear sleeve 40 may also be rotatable relative to the housing 90 of the driver since the lugs 44, 92 may be disengaged. When the driver is powered up, the spindle 85 may rotationally drive the chuck body 20, which in turn may rotationally drive the chuck jaws 2. The chuck jaws 2 may rotate together with the nut 16, the front sleeve 30, and the rear sleeve 40 due to friction between the component parts. Thus, the entire tool chuck 50 may rotate together as a single unit.

An operator may push the rear sleeve 40 to the axial rearward position and with sufficient force to compress the spring 25 so that the power driver may be operated in a chuck actuation mode. Here, the front sleeve 30 and the rear sleeve 40 may be rotationally locked together up to a given torque threshold via the engagement of and interaction between the clutch parts 32, 42 (i.e., the clutch mechanism is active). Also, the rear sleeve 40 and the housing 90 may be rotationally locked together via the engagement of the lugs 44, 92.

When the driver is powered up, the spindle 85 may rotationally drive the chuck body 20, which may rotate together with the chuck jaws 2. The chuck body 20 (and thus the chuck jaws 2) may rotate relative to the nut 16 and the front sleeve 30. This is because the front sleeve 30 may remain rotationally locked to rear sleeve 40 (via the clutch mechanism), and the rear sleeve 40 may remain rotationally locked to the housing 90 (via the lugs 44, 92). The relative rotation between the nut 16 and the chuck body 20 (and thus the chuck jaws 2) may drive the chuck jaws 2 opened or closed (depending on the rotation direction of the spindle 85) by virtue of the interaction between the radially inward facing threads 18 and the radially outward facing threads 3.

As the tool chuck 50 reaches a fully opened or closed position, the nut 16 may become tightened onto the jaw threads 3. At this time, increased rotational forces may be transmitted from the chuck body 20 (and the chuck jaws 2), through the nut 16, and to the clutch part 32. The rotational force may increase to a threshold at which the clutch mechanism may give way (or slip). In this way, the clutch mechanism may limit the torque that may be applied during the chuck actuation process.

The driver may be powered up in opposite rotational directions to respectively tighten or loosen the tool chuck 50. In this regard, and with reference to FIGS. 2-4, the tool chuck 50 may be designed so that when tightened, the clutch mechanism may slip in a direction so that the front sleeve rotates clockwise relative to the rear sleeve. For example, the designer will appreciate that the threads 3 of the chuck jaws 2 and the threads 18 of the nut 16 may be left-handed threads or right-handed threads to achieve the desired chuck jaw actuation. In this way, a given torque threshold for the chuck tightening process may be less than a given torque threshold for the chuck loosening process. Once the clutch mechanism slips, the operator may release the rear sleeve 40, allowing the spring 25 to return the rear sleeve 40 to the forward axial position.

II. Example Embodiment Depicted in FIGS. 5-9

FIGS. 5-9 show another example, non-limiting embodiment of a tool chuck 150 that may be actuated with uniform torque and without operator variability. In this example embodiment, the clutch mechanism may be provided between the rear sleeve and the power driver housing.

Figure 5:
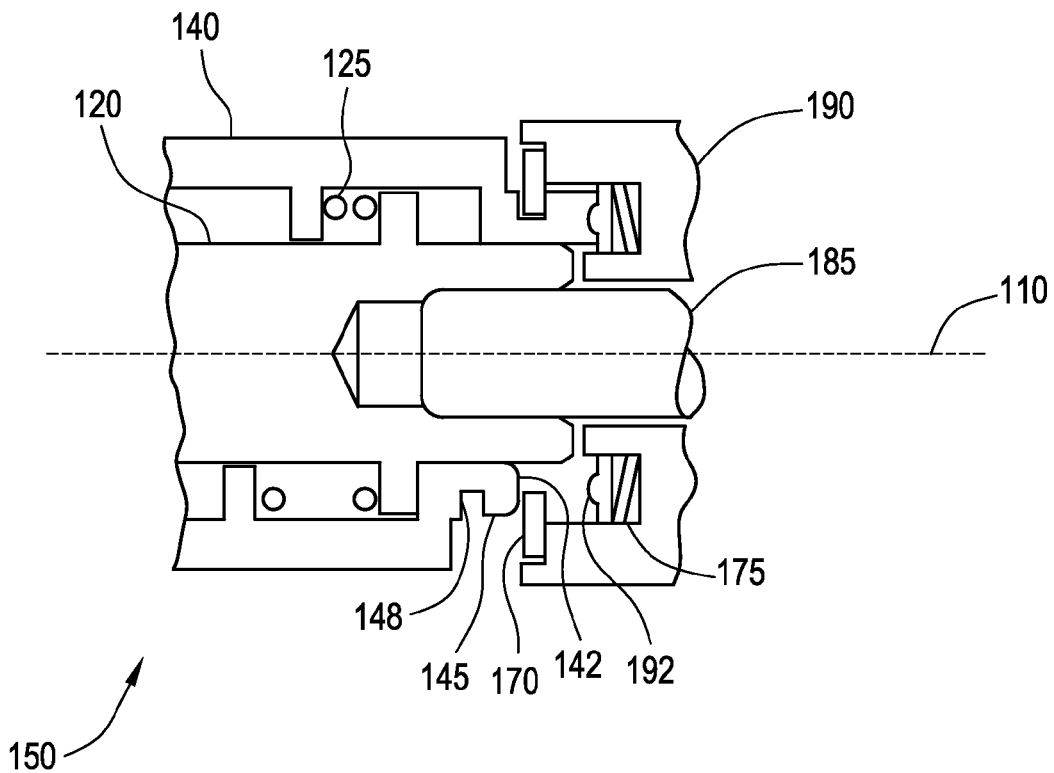
FIG. 5 is a schematic illustration of a tool chuck according to another example, non-limiting embodiment of the present invention.

A. Example Structure:

With reference to FIG. 5, the tool chuck 150 may include a chuck body 120. The rear end of the chuck body 120 may be fixedly mounted on a spindle 185 of a power driver. The forward end of the chuck body 120 may have passageways that slidably support a plurality of chuck jaws (not illustrated). The chuck jaws and how they interact with the nut (and the forward sleeve) may be similar to that of the previous example embodiment. Accordingly, a detailed discussion of the same is omitted herein for purposes of brevity. As in the previous example embodiments, the invention may be implemented with a variety chuck jaw types that may be opened and closed through a relative rotation between tool chuck parts.

The chuck body 120 may support the front sleeve (not illustrated) and a rear sleeve 140. The front sleeve and the rear sleeve 140 may be coupled together so that the rear sleeve 140 is axially moveable relative to the front sleeve and rotationally fixed to the front sleeve. By way of example only, and not as a limitation of the example embodiments of the present invention, the front sleeve may include a longitudinal spline that is received by a cooperating feature provided on the rear sleeve 140. Numerous and varied couplings may be implemented as is known in this art.

The rear sleeve 140 may be supported so that it is axially moveable relative to the chuck body 120 (and thus the front sleeve) between an axial forward position and an axial rearward position. In FIG. 5, the top half of the tool chuck 150 (i.e., above the axis 110) is illustrated with the rear sleeve 140 in the axial rearward position, while the bottom half of the tool chuck 150 (i.e., below the axis 110) is illustrated with the rear sleeve 140 in the axial forward position. A compression spring 125 may be captured between the rear sleeve 140 and the chuck body 120. The compression spring 125 may influence the rear sleeve 140 to the axial forward position.

As will be discussed in more detail below, a clutch mechanism (inclusive of two cooperating clutch parts 142, 192) may be provided between the rear sleeve 140 and the power driver housing 190. The clutch mechanism may rotationally lock the rear sleeve 140 and the housing 190 together up to a given torque threshold. Once the given torque threshold is reached, the clutch mechanism may give way (or slip) to limit the torque that may be applied during the chuck actuation process.

The rear end of the rear sleeve 140 may include legs 145 that project in an axial rearward direction. Each leg 145 may include an intermediate section in which a groove 148 is provided. Each groove 148 may have a bottom surface facing in a radial outward direction. Each leg 145 may also have a distal end supporting the clutch part 142.

The housing 190 may fixedly support a retainer 170. The housing 190 may also support the clutch part 1 92 that may interact with the clutch part 142 of the rear sleeve 140. The clutch part 192 may be rotationally fixed to the housing 190 and axially moveable relative to the housing 190. To this end, the housing 190 and the clutch part 192 may be spline coupled together. Such spline couplings (as well as other alternative couplings) are well known in this art, and therefore a detailed description of the same is omitted herein for purposes of brevity.

The clutch part 192 may be biased in an axial forward direction by a spring mechanism 175. The spring mechanism 175 depicted in FIG. 5 may be in the form of a wave plate. However, the example embodiments of the present invention are not limited in this regard and other conventional spring mechanisms may be implemented.

B. Example Clutch Mechanism:

The structural and functional aspects of the clutch mechanism will become more apparent with reference to FIGS. 6-9, which show example, non-limiting clutch parts that may be implemented in the tool chuck 150 of FIG. 5.

Figure 6:
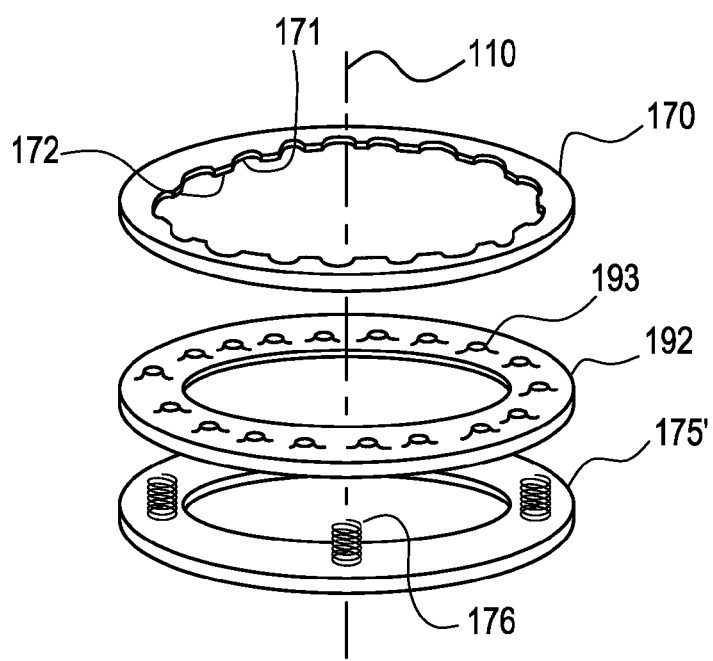
FIG. 6 is an exploded perspective view of example component parts that may be mounted in the driver housing depicted in FIG. 5.

FIG. 6 is an exploded perspective view of the retainer 170, the clutch part 192, and the spring mechanism 175', all of which may be mounted in the housing 190. The retainer 170 may include a radial inward edge along which notches 171 and tabs 172 may be alternately arranged. The retainer 170 may interact with the legs 145 of the rear sleeve 140 as follows. The notches 171 may accommodate an axial movement of the legs 145. That is, when the rear sleeve 140 is moved to (and from) the axial rearward position, the legs 145 may slide in an axial direction through the notches 171 of the retainer 170. The tabs 172 may enter into the grooves 148 of the legs 145 when the rear sleeve 140 (positioned in the axial rearward position) is rotated. In this way, the tabs 172 of the retainer 170 may retain the rear sleeve 140 in the axial rearward position.

In this example embodiment, the clutch part 192 may have one side provided with a plurality of detents 193. The detents 193 may project in an axial direction from the clutch part 192. The detents 193 may interact with the clutch part 142 of the rear sleeve 140. In FIG. 6, the spring mechanism 175' may be in the form of a body having one side that supports a plurality of compression springs 176. The compression springs 176 may abut against the clutch part 192. The example embodiments of the present invention are not limited to a particular spring mechanism. For example, as noted above, the spring mechanism may be in the form of a wave plate (as shown in FIG. 5) or some other conventional spring mechanism.

Figure 7:
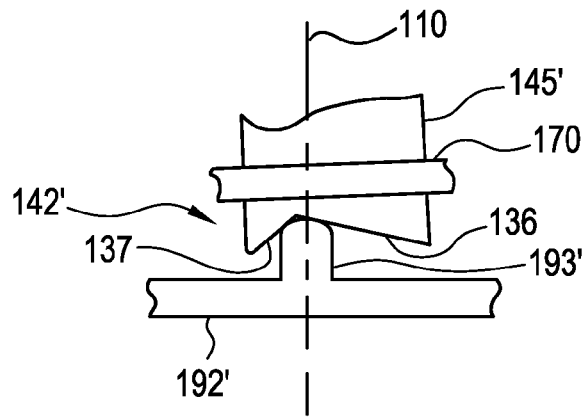
FIGS. 7-9 are schematic illustrations of example clutch mechanisms that may be implemented in the tool chuck of FIG. 5.
Figure 8:
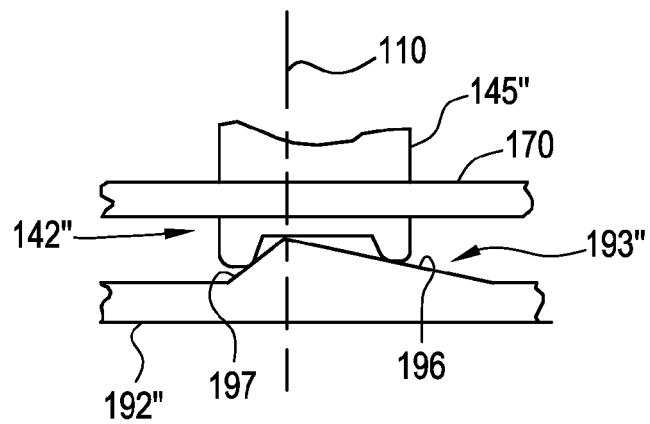
Figure 9:
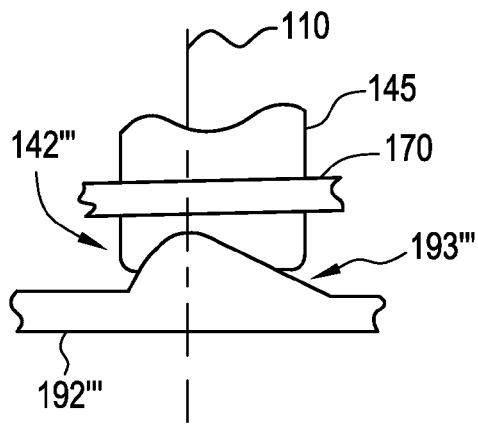

In FIGS. 7-9, the rear sleeve is depicted in the axial rearward position so that the clutch parts may be operatively engaged. Further, the tabs 172 may be positioned in the grooves 148 of the legs 145 so that the retainer 170 may retain the rear sleeve 140 in the axial rearward position (against the influence of the spring mechanism 175 and the compression spring 125).

B(1). Example Clutch Mechanism of FIG. 7:

As shown in FIG. 7, the clutch part of the rear sleeve may be in the form of a raised feature 142' provided on the distal end of the leg 145'. The raised feature 142' may include two ramps 136, 137. The raised feature 142' may interact with the detent 193' of the clutch part 192' mounted in the housing.

During a chuck actuation process, and when the tool chuck 150 is not fully opened or closed (e.g., while the chuck jaws are still opening or closing), the raised feature 142' may abut against the detent 193' so that the rear sleeve and the housing may be rotationally locked together. When the tool chuck fully closes (with or without an inserted accessory) or fully opens, a rotational force applied by the raised feature 142' to the detent 193' may increase. Here, the rotational force may increase to a threshold at which the detent 193' (together with the clutch part 192') may be driven in an axial rearward direction (against the influence of the spring mechanism) so that the raised feature 142' may slide across and past the detent 193'. In this way, the clutch mechanism may give way (or slip), thereby limiting the torque that may be applied during the chuck actuation process.

The magnitude of the rotational force necessary to drive the detent 193' in the axial rearward direction may be affected by, for example, the strength of the spring mechanism 175 and the degree to which the working surface of the raised feature 142' is inclined (or slanted) relative to the axis 110. The smaller the angle between the working surface and the axis 110, the greater the rotational force necessary to make the clutch mechanism slip.

As shown in FIG. 7, a working surface of the ramp 136 may be inclined (relative to the axis 110) to a greater degree than a working surface of the ramp 137. In this way, the rotational force (or threshold torque) causing the clutch mechanism slip in a first direction (i.e., when the detent 193' is driven in the axial rearward direction via the working surface of the ramp 136) may be less than the rotational force (or threshold torque) causing the clutch mechanism slip in a second direction (i.e., when the detent 193' is driven in the axial rearward direction via the working surface of the ramp 137). This threshold torque differential may be implemented so that a given torque threshold for the chuck tightening process may be less than a given threshold for the chuck loosening process.

B(2). Example Clutch Mechanism of FIG. 8:

As shown in FIG. 8, the clutch part of the rear sleeve may be in the form of a raised feature 142" provided on the distal end of the leg 145". The raised feature 142" may include two shoulders. The detent 193" of the clutch part 192" mounted in the housing may include two ramps 196, 197.

During a chuck actuation process, and when the tool chuck 150 is not fully opened or closed, the raised feature 142" may abut against the detent 193" so that the rear sleeve and the housing may be rotationally locked together. When the tool chuck fully closes or fully opens, a rotational force applied by the raised feature 142" to the detent 193" may increase. Here, the rotational force may increase to a threshold at which the detent 193" may be driven in an axial rearward direction (against the influence of the spring mechanism) so that the raised feature 142" may slide across and past the detent 193". In this way, the clutch mechanism may give way (or slip), thereby limiting the torque that may be applied during the chuck actuation process.

As shown in FIG. 8, a working surface of the ramp 196 may be inclined (relative to the axis 110) to a lesser degree than a working surface of the ramp 197. In this way, the rotational force (or threshold torque) causing the clutch mechanism slip in a first direction (i.e., when the detent 193" is driven in the axial rearward direction via the working surface of the ramp 196) may be less than the rotational force (or threshold torque) causing the clutch mechanism slip in a second direction (i.e., when the detent 193" is driven in the axial rearward direction via the working surface of the ramp 197). This threshold torque differential may be implemented so that a given torque threshold for the chuck tightening process may be less than a given threshold for the chuck loosening process.

B(3). Example Clutch Mechanism of FIG. 9:

The example clutch mechanism of FIG. 9 is somewhat similar to the example clutch mechanisms depicted in FIGS. 7 and 8. Differences are discussed in detail hereafter. For example, as shown in FIG. 9, the cooperating clutch parts 142''', 192''' may have working surfaces with complementary profiles. Also, the working surfaces of the clutch parts may be curved. The interaction between the clutch parts 142''', 192''' may be similar to that described above with respect to the examples illustrated in FIGS. 7 and 8.

C. Example Operation:

The tool chuck 150 may operate differently depending on the axial position of the rear sleeve 140. When the rear sleeve 140 is in the axial forward position, as shown in the bottom half of FIG. 5 (i.e., below the axis 110), the power driver may be operated in a normal operating mode. Here, the rear sleeve 140 may be rotatable relative to the housing 190 since the clutch parts 142,192 may be disengaged (i.e., the clutch mechanism is inactive). When the driver is powered up, the spindle 185 may rotationally drive the chuck body 120, which in turn may rotationally drive the chuck jaws. The chuck jaws may rotate together with the nut, the front sleeve, and the rear sleeve 140. Thus, the entire tool chuck 150 may rotate together as a single unit.

To achieve a chuck actuation mode, an operator may push the rear sleeve 140 to the axial rearward position and with sufficient force to compress the spring 125. As the rear sleeve 140 moves in the axial rearward direction (relative to the front sleeve, the chuck body 120, and the housing 190), the legs 145 may pass through the notches 171 of the retainer 170. The legs 145 may penetrate axially through the notches 171 by a sufficient distance so that the clutch parts 142 of the legs may press the clutch part 192 of the housing 190 in an axial direction against the influence of the spring mechanism 175.

The operator may then turn the rear sleeve 140 so that the tabs 172 of the retainer 170 may enter into the grooves 148 of the legs 145, as shown in the top half of FIG. 5 (i.e., above the axis 110). At this time, the operator may release the rear sleeve 140, which may remain in the axial rearward position by virtue of the tabs 172 being inserted into the slots 148. In this condition, the rear sleeve 140 and the housing 190 may be rotationally locked together up to a given torque threshold via the engagement of and interaction between the clutch parts 142, 192 (i.e., the clutch mechanism is active).

When the driver is powered up, the spindle 185 may rotationally drive the chuck body 120, which may rotate together with the chuck jaws. The chuck body 120 (and thus the chuck jaws) may rotate relative to the nut and the front sleeve. This is because the front sleeve may remain rotationally locked to the rear sleeve 140 (via the spline coupling), which in turn may remain rotationally locked to the housing 190 (via the clutch mechanism). The relative rotation between the nut and the chuck body 120 (and thus the chuck jaws) may drive the chuck jaws opened or closed (depending on the rotation direction of the spindle 185).

As the tool chuck 150 reaches a fully opened or closed position, the nut may become tightened onto the chuck jaws. At this time, increased rotational forces may be transmitted from the chuck body 120 (and the chuck jaws), through the nut and the front sleeve, and to the clutch part 142. The rotational force may increase to a threshold at which the clutch mechanism may give way (or slip). In this way, the clutch mechanism may limit the torque that may be applied during the chuck actuation process.

The driver may be powered up in opposite rotational directions to respectively tighten or loosen the tool chuck 150. In this regard, and with reference to FIGS. 7-9, the tool chuck 150 may be designed so that when tightened, the clutch mechanism may slip in a direction so that the legs 145', 145", 145''' may move to the left relative to the retainer 170. In this way, a given torque threshold for the chuck tightening process may be less than a given torque threshold for the chuck loosening process.

When the clutch mechanism slips, the rear sleeve 140 may rotate relative to the housing 190 (and thus the retainer 170). During this relative rotation, the legs 145 may enter into the notches 171 of the retainer 170, and at the same time the tabs 172 of the retainer 170 may slide through and exit from the grooves 148 of the legs 145. Once the tabs 172 exit from the grooves 148, the spring 125 may return the rear sleeve 140 to the axial forward position. This may give the operator an audible and/or visual indication that the chuck actuation process is complete.

III. Example Embodiment Depicted in FIGS. 10-15

FIGS. 10-15 show another example, non-limiting embodiment of a tool chuck 250 that may be actuated with uniform torque and without operator variability. In this example embodiment, the clutch mechanism may be provided between an outer sleeve and the power driver housing.

Figure 10:
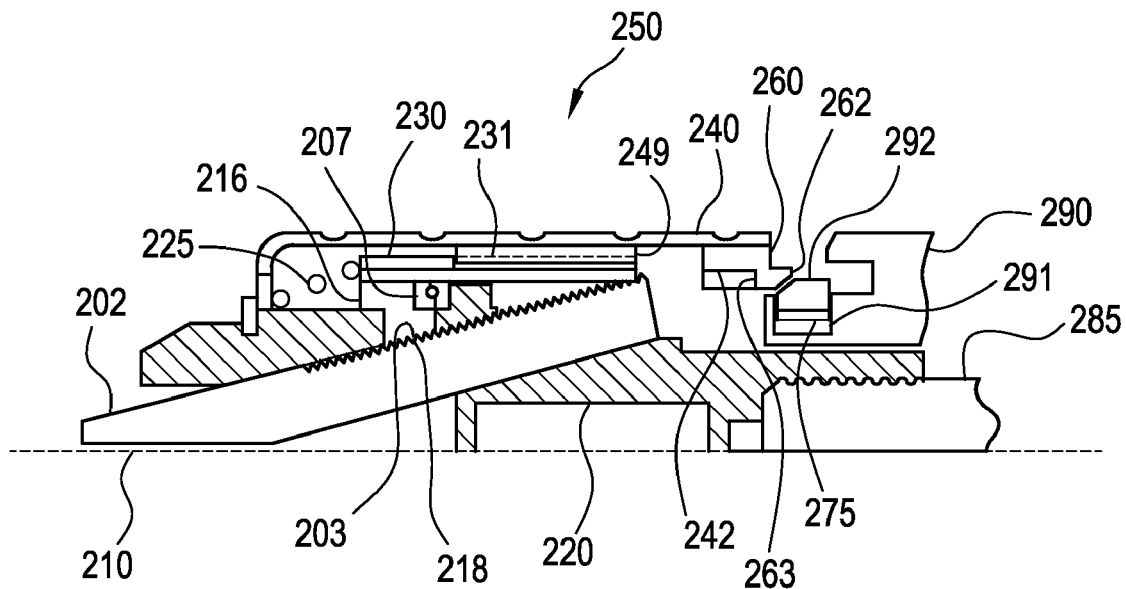
FIG. 10 is a partial schematic illustration of a tool chuck according to another example, non-limiting embodiment of the present invention.

A. Example Structure:

With reference to FIG. 10, the tool chuck 250 may include a chuck body 220. The rear end of the chuck body 220 may be fixedly mounted on a spindle 285 of a power driver. The forward end of the chuck body 220 may have passageways that slidably support a plurality of chuck jaws 202. The chuck jaws 202 may be inclined so that respective forward ends of the chuck jaws 202 converge toward an axis 210 of the chuck body 220. The chuck jaws 202 may have respective radially outward facing threads 203. The chuck jaws 202 may be actuated (i.e., advanced and/or retracted) via the radially outward facing threads 203 interacting with radially inward facing threads 218 of a nut 216. As in the previous example embodiments, the invention may be implemented with a variety chuck jaw types (as opposed to the illustrated "threaded" chuck jaws) that may be opened and closed through a relative rotation between tool chuck parts.

The chuck body 220 may support an inner sleeve 230 and an outer sleeve 240. The inner sleeve 230 and the outer sleeve 240 may be coupled together so that the outer sleeve 240 is axially moveable relative to the inner sleeve 230 and rotationally fixed to the inner sleeve 230. By way of example only, and not as a limitation of the example embodiments of the present invention, the inner sleeve 230 may include a longitudinal spline 231 that is received by a cooperating feature 249 provided on the outer sleeve 240. Numerous and varied couplings between the inner and the outer sleeves may be implemented as is known in this art.

The inner sleeve 230 may be supported so that it is axially fixed to the chuck body 220 and rotatable relative to the chuck body 220. The inner sleeve 230 may fixedly carry the nut 216. A bearing 207 may be interposed between the nut 216 and the chuck body 220 to facilitate a relative rotation between the nut 216 and the chuck body 220.

The outer sleeve 240 may be supported so that it is axially moveable relative to the chuck body 220 (and thus the inner sleeve 230) between an axial forward position and an axial rearward position. In FIG. 10, the tool chuck 250 is illustrated with the outer sleeve 240 in the axial forward position. A compression spring 225 may be captured between the inner sleeve 230 and the outer sleeve 240. The compression spring 225 may influence the outer sleeve 240 to the axial forward position.

As will be discussed in more detail below, a clutch mechanism (inclusive of two cooperating clutch parts 242, 292) may be provided between the outer sleeve 240 and the housing 290 of the driver. The clutch mechanism may rotationally lock the outer sleeve 240 and the housing 290 together up to a given torque threshold. Once the given torque threshold is reached, the clutch mechanism may give way (or slip) to limit the torque that may be applied during the chuck actuation process.

The rear end of the outer sleeve 240 may support a latch ring 260. The latch ring 260 may have a distal end with a cam surface 262 facing in an axial rearward direction and a stop surface 263 facing in an axial forward direction. The cam surface 262 may be inclined relative to the axis 210, while the stop surface 263 may be perpendicular to the axis 210. The latch ring 260 may also include the clutch part 242.

The housing 290 may support the clutch part 292 that may interact with the clutch part 242 of the outer sleeve 240. The clutch part 292 may be rotationally fixed to the housing 290 and moveable relative to the housing 290 in a radial direction. To this end, the housing 290 may include a pocket 291 in which the clutch part 292 is slidably provided. The clutch part 292 may be biased in a radial outward direction via a spring mechanism 275. The spring mechanism 275 depicted in FIG. 10 may be in the form of a leaf spring, but the invention are not limited in this regard. For example, the spring mechanism may be in the form of a wave plate, a coil spring, an elastomeric member, or some other conventional spring mechanisms may be implemented.

Figure 13:
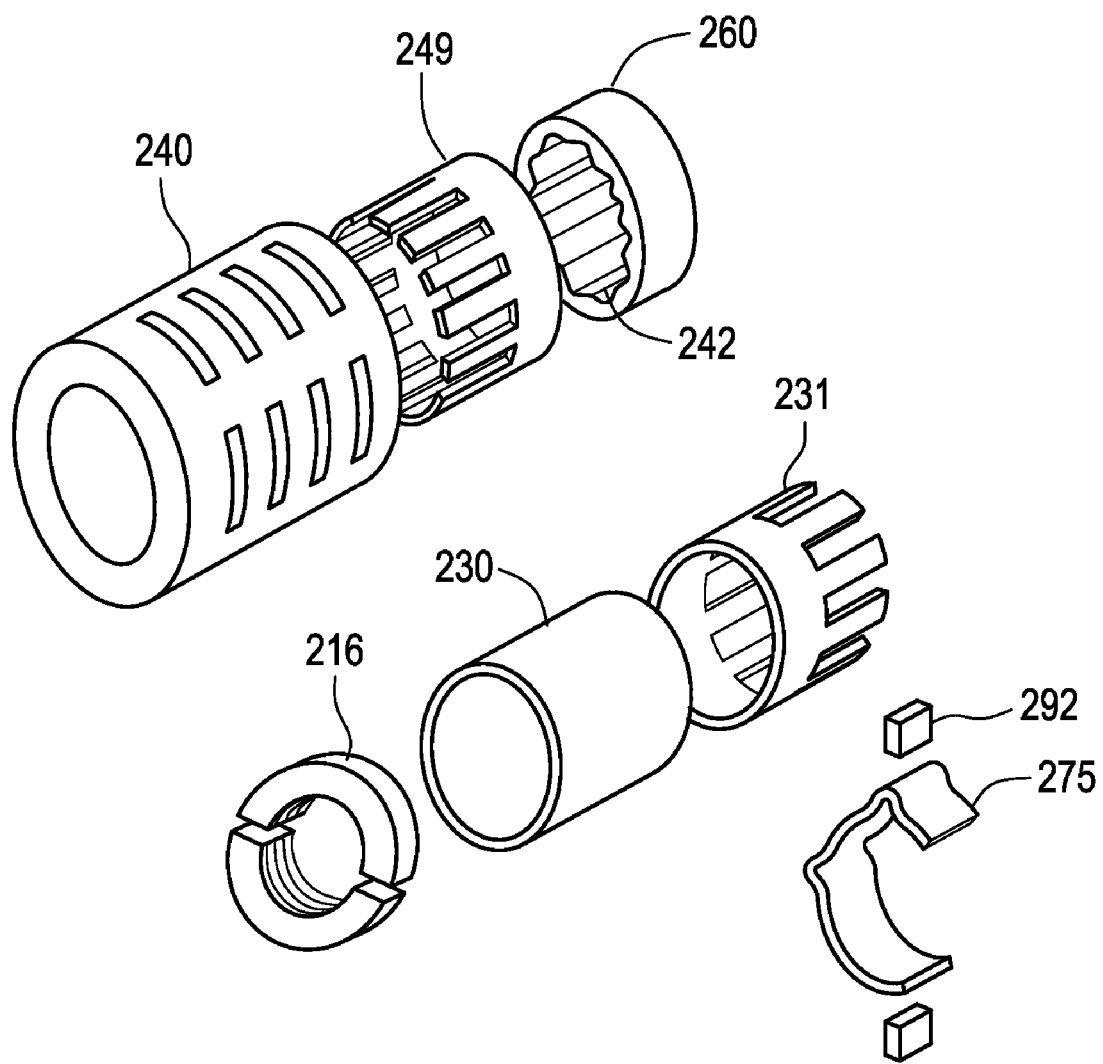
FIG. 13 is an exploded perspective view of example component parts of the tool chuck of FIG. 10.

In this example embodiment, and turning briefly to FIG. 13, the outer sleeve 240, the cooperating feature 249, and the latch ring 260 may be provided as separate and distinct elements, and this may facilitate assembly of the tool chuck 250. However, the example embodiments of the present invention are not limited in this regard since the outer sleeve 240, the cooperating feature 249, and the latch ring 260 may be of a unitary, one-piece construction. Similarly, the nut 216, the inner sleeve 230, and the spline 231 may be provided as separate and distinct elements, and this may facilitate assembly of the tool chuck 250. However, the example embodiments of the present invention are not limited in this regard since the nut 216, the inner sleeve 230, and the spline 231 may be of a unitary, one-piece construction.

In this example embodiment, two clutch parts 292 may be mounted on the housing 290. It will be appreciated, however, that the example embodiments of the present invention are not limited to any specific number of clutch parts 292. For example, a single clutch part 292 (or more than two clutch parts 292) may be implemented. Also, a single spring mechanism 275 may be provided to bias all of the clutch parts 292 in the radial outward direction. It will be appreciated, however, that additional spring mechanisms 275 may be implemented. For example, a spring mechanism 275 may be individually provided for each of the clutch parts 292.

B. Example Clutch Mechanisms:

Structural and functional aspects of the clutch mechanism may become more apparent with reference to FIGS. 11, 12, 14 and 15, which show example, non-limiting clutch parts that may be implemented in the tool chuck 250 of FIG. 10. In FIGS. 11, 12, 14, and 15, the outer sleeve is depicted in the axial rearward position so that the clutch parts may be operatively engaged. In this condition, one clutch part 292 may be located radially inward of the other clutch part 242. The working surfaces of the clutch parts may face in directions that are perpendicular to the axis 210 of the tool chuck 250.

Figure 11:
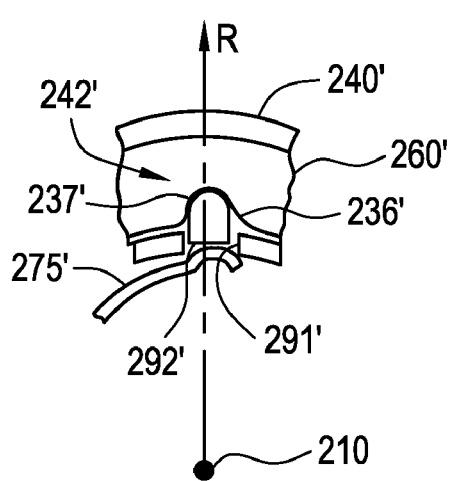
FIGS. 11 and 12 are schematic illustrations of an example clutch mechanism that may be implemented in the tool chuck of FIG. 10.
Figure 12:
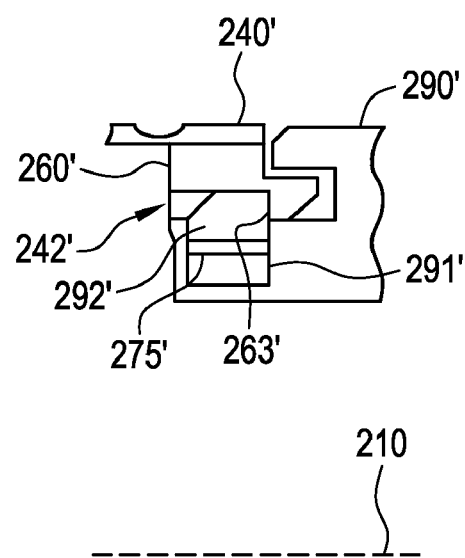

B(1). Example Clutch Mechanism of FIGS. 11 and 12:

As shown in FIGS. 11 and 12, the clutch part of the outer sleeve 240' may be in the form of a raised feature 242' provided on the latch ring 260'. The raised feature 242' may include two ramps 236', 237'. The clutch part mounted in the housing 290' may be in the form of a detent 292'.

During a chuck actuation process, and when the tool chuck 250 is not fully opened or closed (e.g., while the chuck jaws are still opening or closing), the raised feature 242' may abut against the detent 292' so that the rear sleeve 240' and the housing 290' may be rotationally locked together. When the tool chuck fully closes (with or without an inserted accessory) or fully opens, a rotational force applied by the raised feature 242' to the detent 292' may increase. Here, the rotational force may increase to a threshold at which the detent 292' may be driven in a radial inward direction (and deeper into the pocket 291') against the influence of the spring mechanism 275' so that the raised feature 242' may slide across and past the detent 292'. In this way, the clutch mechanism may give way (or slip), thereby limiting the torque that may be applied during the chuck actuation process.

The magnitude of the rotational force necessary to drive the detent 292' in the radial inward direction may be affected by, for example, the strength of the spring mechanism 275' and the degree to which the working surface of the raised feature 242' is inclined (or slanted) relative to the radial reference line R. The smaller the angle between the working surface and the radial reference line R, the greater the rotational force necessary to make the clutch mechanism slip.

As shown in FIG. 11, a working surface of the ramp 236' may be inclined (relative to the radial reference line R) to a greater degree than a working surface of the ramp 237'. In this way, the rotational force (or threshold torque) causing the clutch mechanism slip in a first direction (i.e., when the detent 292' is driven in the radial inward direction via the working surface of the ramp 236') may be less than the rotational force (or threshold torque) causing the clutch mechanism slip in a second direction (i.e., when the detent 292' is driven in the radial inward direction via the working surface of the ramp 237'). This threshold torque differential may be implemented so that a given torque threshold for the chuck tightening process may be less than a given threshold for the chuck loosening process.

In this example embodiment, and with reference to FIG. 12, the stop surface 263' of the latch ring 260' may press in an axial forward direction against the axial rear end of the detent 292'. The interaction between the stop surface 263' and the detent 292' may not provide a cam action that would cause the detent 292' to move in the radial inward direction against the influence of the spring mechanism 275'. In this way, the detent 292' may retain the outer sleeve 240' in the axial rearward position (and against the influence of the compression spring 225). The rear sleeve 240' may be axially retained in this fashion until the raised feature 242' slides across the detent 292', thereby driving the detent 292' in a radial inward direction and into the pocket 291'.

Figure 14:
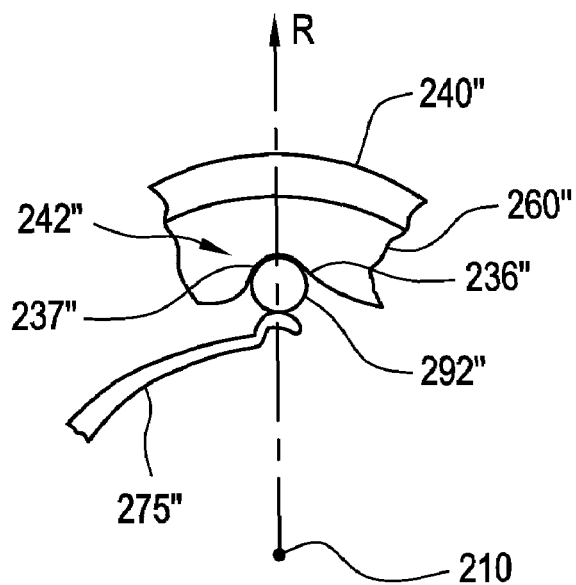
FIGS. 14 and 15 are schematic illustrations of an example clutch mechanism that may be implemented in the tool chuck of FIG. 10.
Figure 15:
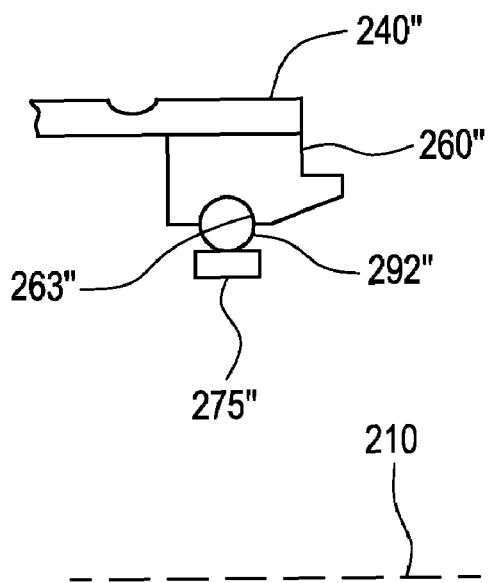

B(2). Example Clutch Mechanism of FIGS. 14 and 15:

As shown in FIGS. 14 and 15, the clutch part of the outer sleeve 240" may be in the form of a raised feature 242" provided on the latch ring 260". The raised feature 242" may include two ramps 236", 237". The clutch part mounted in the housing may be in the form of a detent 292". The detent 292" may have a spherical shape.

During a chuck actuation process, and when the tool chuck 250 is not fully opened or closed, the raised feature 242" may abut against the detent 292" so that the rear sleeve 240" and the housing may be rotationally locked together. When the tool chuck fully closes or fully opens, a rotational force applied by the raised feature 242" to the detent 292" may increase. Here, the rotational force may increase to a threshold at which the detent 292" may be driven in a radial inward direction against the influence of the spring mechanism 275" so that the raised feature 242" may slide across and past the detent 292". In this way, the clutch mechanism may give way (or slip), thereby limiting the torque that may be applied during the chuck actuation process.

As shown in FIG. 14, a working surface of the ramp 236" may be inclined (relative to the radial reference line R) to a greater degree than a working surface of the ramp 237". In this way, the rotational force (or threshold torque) causing the clutch mechanism slip in a first direction (i.e., when the detent 292" is driven in the radial inward direction via the working surface of the ramp 236") may be less than the rotational force (or threshold torque) causing the clutch mechanism slip in a second direction (i.e., when the detent 292" is driven in the radial inward direction via the working surface of the ramp 237"). This threshold torque differential may be implemented so that a given torque threshold for the chuck tightening process may be less than a given threshold for the chuck loosening process.

In this example embodiment, and with reference to FIG. 15, the stop surface 263" of the latch ring 260" may be contiguous with the ramps 236", 237" of the raised feature 242". For example, the latch ring 260" may be provided with a groove that defines the ramps 236", 237" and the stop surface 263". Here, a radial inward facing wall of the groove may define the ramps 236", 237", while an axial forward facing wall of the groove may define the stop surface 263". In FIG. 15, the groove may extend into the plane of the drawing sheet.

The stop surface 263" may press in an axial forward direction against the axial rear end of the detent 292". The interaction between the stop surface 263" and the detent 292" may not provide a cam action that would cause the detent 292" to move in the radial inward direction against the influence of the spring mechanism 275". In this way, the detent 292" may retain the outer sleeve 240" in the axial rearward position (and against the influence of the compression spring 225). The rear sleeve 240" may be axially retained in this fashion until the raised feature 242″ slides across the detent 292″, thereby driving the detent 292″ in a radial inward direction.

C. Example Operation:

The tool chuck 250 may operate differently depending on the axial position of the outer sleeve 240. When the outer sleeve 240 is in the axial forward position, as shown in FIG. 10, the power driver may be operated in a normal operating mode. Here, the outer sleeve 240 may be rotatable relative to the housing 290 since the clutch parts 242, 292 may be disengaged (i.e., the clutch mechanism is inactive).

As the driver is powered up, the spindle 285 may rotationally drive the chuck body 220, which in turn may rotationally drive the chuck jaws 202. The chuck jaws 202 may rotate together with the nut 216, the inner sleeve 230, and the outer sleeve 240. Thus, the entire tool chuck 250 may rotate together as a single unit.

To achieve a chuck actuation mode, an operator may push the outer sleeve 240 to the axial rearward position and with sufficient force to compress the spring 225. As the outer sleeve 240 moves in the axial rearward direction (relative to the inner sleeve 230, the chuck body 220, and the housing 290), the cam surface 262 of the latch ring 260 may slide over the clutch part 292, thereby driving the clutch part 292 in the radial inward direction against the influence of the spring mechanism 275. Eventually, the stop surface 263 of the latch ring 260 may move in the axial rearward direction beyond the clutch part 292. At this time, the spring mechanism 275 may drive the clutch part 292 in the radial outward direction and into engagement with the clutch part 242 (as shown in FIG. 12 or FIG. 15, for example).

When the clutch parts 292, 242 engage, the operator may release the outer sleeve 240. The outer sleeve 240 may remain in the axial rearward position by virtue of the clutch part 292 abutting against the stop surface 263 of the latch ring 260. In this condition, the outer sleeve 240 and the housing 290 may be rotationally locked together up to a given torque threshold via the engagement of and interaction between the clutch parts 242, 292 (i.e., the clutch mechanism is active).

When the driver is powered up, the spindle 285 may rotationally drive the chuck body 220, which may rotate together with the chuck jaws 202. The chuck body 220 (and thus the chuck jaws 202) may rotate relative to the nut 216 and the inner sleeve 230. This is because the inner sleeve 230 may remain rotationally locked to the outer sleeve 240 (via the spline 231 and the cooperating feature 249), which in turn may remain rotationally locked to the housing 290 (via the clutch mechanism). The relative rotation between the nut 216 and the chuck body 220 (and thus the chuck jaws 202) may drive the chuck jaws 202 opened or closed (depending on the rotation direction of the spindle 285).

As the tool chuck 250 reaches a fully opened or closed position, the nut 216 may become tightened onto the chuck jaws 202. At this time, increased rotational forces may be transmitted from the chuck body 220 (and the chuck jaws 202), through the nut 216 and the inner sleeve 230, and to the clutch part 242. The rotational force may increase to a threshold at which the clutch mechanism may give way (or slip). In this way, the clutch mechanism may limit the torque that may be applied during the chuck actuation process.

The driver may be powered up in opposite rotational directions to respectively tighten or loosen the tool chuck 250. Accordingly, as in the previous example embodiments, a given torque threshold for the chuck tightening process may be less than a given torque threshold for the chuck loosening process.

When the clutch mechanism slips, the outer sleeve 240 (and thus the latch ring 260) may rotate relative to the housing 290. During this relative rotation, the clutch part 292 may be driven in the radial inward direction (via the clutch part 242). The clutch part 292 may separate from the stop surface 263 so that the spring 225 may return the rear sleeve 240 to the forward axial position. This may give the operator an audible and visual indication that the chuck actuation process is complete.

FIG. 16 illustrates a clutch ring mechanism adapted as a user interface for controlling a power drill driver motor for accessory retention/disengagement. The clutch ring mechanism to be described in further detail below may be applicable to any of the example tool chuck with clutch mechanisms as shown and described in FIGS. 1-15. Referring to FIG. 16, a clutch ring 410 on a power drill driver 400 may be used as user control for engaging or disengaging the drill's motor to provide bit retention. For purposes of explanation only, the following modes will be described: tighten mode, drilling mode and accessory release mode. In this example, the accessory may be a drill bit, although the example embodiments are not so limited.

In the tighten mode, with a user's finger off of the trigger 420, the use may pull back the clutch ring 410 (which may be spring loaded, for example), so as to engage a mechanical linkage 430 (shown in FIG. 16 as a shaft running longitudinally with the tool, although this is merely one example of a linkage 430). As the clutch ring 410 is pulled back (shown by arrow 437), linkage 430 moves rearward against a spring 435, so as to prevent the chuck 440 from rotating. For example, the linkage 430 mechanically grounds the sleeve (such as any of the outer sleeves 40, 140, 240, etc. shown here above), through the clutch mechanism, to the body of the tool before the switch contacts are made. Linkage 430 also may be adapted to bypass trigger 420 so as to possibly lock out the trigger 420 (not shown for purposes of clarity). As the clutch ring 410 is fully pulled back (depressed), the linkage 430 closes a contact 445 on the tool's switch 450 to start the tool motor, tightening the bit within jaws 442 of the chuck 440.

In an example, and to provide audible feedback that the clutch mechanism (not shown, but any of the clutch mechanisms shown in FIGS. 1-15) is working as desired, a ratcheting noise may be emitted from the tool 400 during the time elapsed as the bit is being tightened (typically a few seconds), as is known to one of ordinary skill in this art. Once the bit is tightened, the user releases the clutch ring 410 so that the clutch ring 410 returns to a neutral position. With the clutch ring in a neutral position (drilling mode), the torque on the chuck 440 may be adjusted as desired and the trigger 420 depressed for typical drill driver 400 power operations in a drilling mode.

In a bit release mode, the user may push or slide the clutch ring 410 forward toward chuck 440, so as to lock out trigger 420. Linkage 430 may be extended in direction 439 to close a second contact 447 on the tool's switch 450 to reverse the motor, opening jaws 442 to release the bit. No trigger 420 action is necessary for bit disengagement.

The push/pull action of the clutch ring 410 is thus intuitive for ease of use and understanding. Because the chuck 440 is prevented from rotation for either locking or unlocking a bit, the chuck 440 does not need to be gripped tightly during rotation, providing additional user comfort. Since one hand of the user is on the tool handle 460 and the other manipulating the clutch ring 410, bit retention is possible without requiring a tight grip on a rotating clutch ring 410, potentially improving the securing of the bit within the jaws 442 of the chuck 440

IV. Example Embodiment Depicted in FIGS. 17A-17B

Figure 17A:
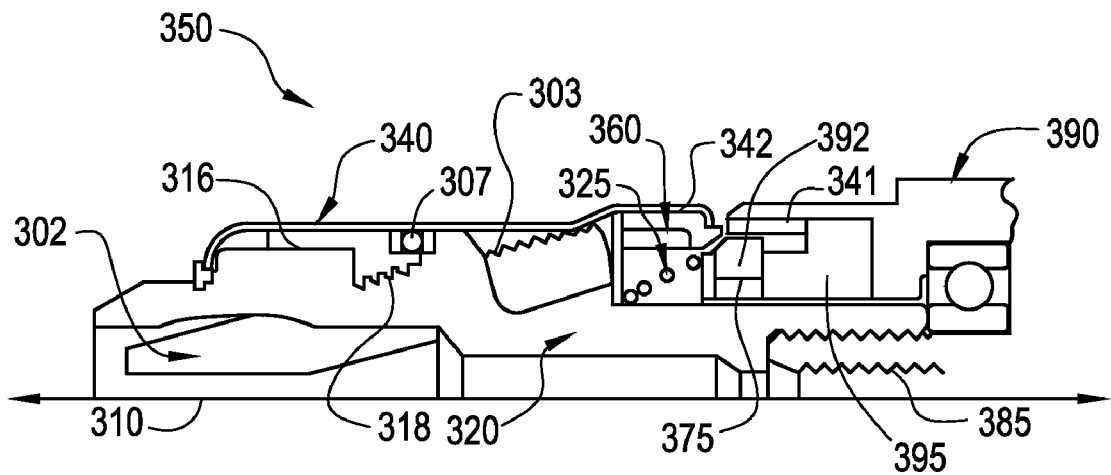
FIGS. 17A and 17B are schematic illustrations of an example clutch mechanism for an example tool chuck.
Figure 17B:
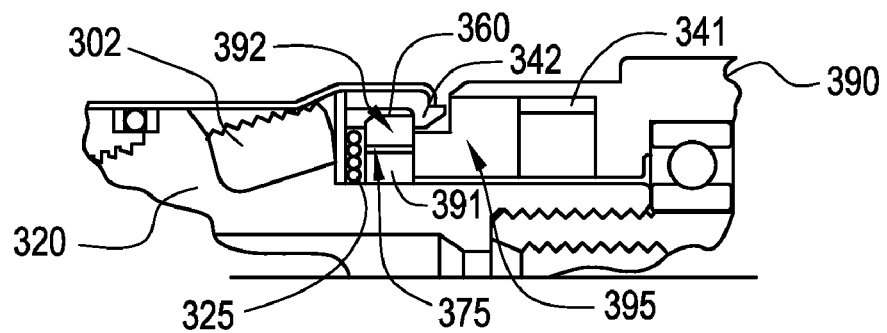

FIGS. 17A and 17B show another example, non-limiting embodiment of a tool chuck 350 with clutch mechanism that may be actuated with uniform torque and without operator variability. In this example embodiment, the chuck sleeve does not move axially; rather the clutch mechanism moves axially to engage an axially fixed sleeve 340. FIGS. 17A and 17B thus illustrate another example clutch mechanism which may provide consistent tightening on a chuck body 320, so as to prevent inadvertent loosening of the chuck jaws 302 caused by contact between a chuck sleeve 340 and the work piece.

In previous example embodiments as shown in FIGS. 1-15, one of an inner and/or outer sleeve moves axially to engage a clutch mechanism which grounds the sleeve to the tool housing, allowing the chuck jaws to be loosened or tightened. The clutch mechanism then releases the sleeve at a given torque setting. In some applications, it may be possible for the user to cause the chuck body to contact the work piece such that the sleeve would move, causing it to inadvertently engage the clutch mechanism. However, as will be shown in FIGS. 17A and 17B, the sleeve does not move axially, but rather the clutch mechanism moves axially forward to engage a fixed sleeve in an effort to prevent inadvertent loosening or tightening of the chuck jaws.

FIG. 17A illustrates a tool chuck 350 with clutch mechanism (comprised of clutch part 342 and cooperating clutch part 392) shown as disengaged. In FIG. 17A, the tool chuck 350 may include a chuck body 320. The rear end of the chuck body 220 may be fixedly mounted on a spindle 385 of a power driver. The forward end of the chuck body 320 may have passageways that slidably support a plurality of chuck jaws 302. The chuck jaws 302 may be inclined so that respective forward ends of the chuck jaws 302 converge toward an axis 310 of the chuck body 320. The chuck jaws 302 may have respective radially outward facing threads 303. The chuck jaws 302 may be actuated (i.e., advanced and/or retracted) via the radially outward facing threads 303 interacting with radially inward facing threads 318 of a nut 316. As in the previous example embodiments, the invention may be implemented with a variety of chuck jaw types (as opposed to the illustrated "threaded" chuck jaws) that may be opened and closed through a relative rotation between tool chuck parts.

Unlike the previous example embodiments, the chuck body 320 supports only a single outer sleeve 340, which remains axially fixed to the chuck body 320. Sleeve 340 may fixedly carry the nut 316. A bearing 307 may be interposed between the nut 316 and the chuck body 320 to facilitate a relative rotation between the nut 316 and the chuck body 320.

FIG. 17B shows the clutch mechanism in an engaged position. Referring to both FIGS. 17A and 17B, the clutch mechanism may include a clutch part 342 interfacing a cooperating clutch part 392, which may be referred to as a latch pawl 392. Unlike previous example embodiments, the clutch mechanism housing 395 may be keyed to the front of the tool housing 390 using splines 341, allowing the latch pawl 392 of the clutch mechanism to move axially to engage a latch ring 360 while preventing rotation of the clutch mechanism housing 395 relative to the tool housing 390, as shown in FIG. 17B.

Further as shown with reference to both FIGS. 17A and 17B, when the latch pawl 392 is moved forward axially against a bias spring 325 to engage the chuck body 320, the latch pawl 392 may be pushed radially inward against a pawl spring 375 into the clutch mechanism housing 395, as shown in FIG. 17A. As the clutch mechanism housing 395 continues to move axially towards the chuck body 320, the latch pawl 392 springs outward radially to engage the recesses or pockets 391 in the latch ring 360. The tool motor can then be run forward/reverse as needed to loosen/tighten the chuck jaws 302. At a given torque, the latch pawl 392 may slip out of the latch ring pockets 391, and the bias spring 325 returns the clutch mechanism housing 395 to the disengaged position. The clutch mechanism may be actuated by a sliding button or rotating sleeve with cam surface, or other user desired means as would be evident to one skilled in the art.

Desired clearance between splines 341 on the tool housing 390 and splines (not shown) on the clutch mechanism housing 395 may be provided to permit limited rotation of the clutch mechanism housing 395 relative to the tool housing 390. This may assist ensuring a desired engagement of the latch pawl 392 and latch ring pocket 391 without rotation of either the chuck body 320 or the sleeve 340.

The example clutch mechanism in tool chuck 350 may thus provide a simple, intuitive operation, potentially achieving improved tightening and loosening torque to the chuck 350 than a user can apply using a conventional method of gripping a chuck sleeve while turning on the motor. The example embodiment shown in FIGS. 17A and 17B may thus be adapted to apply consistent tightening torque to prevent the chuck jaws 302 from being over-tightened. Further, the example embodiment may be adapted to existing tool designs without a complete re-design of the tool transmission.

Figure 18A:
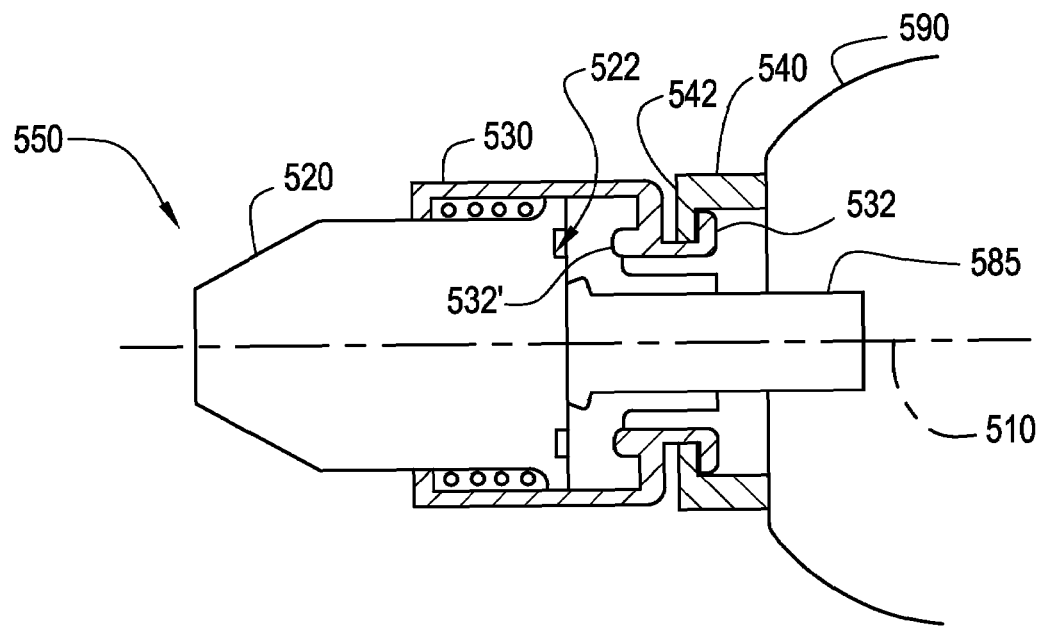
FIGS. 18A and 18B illustrate a locking mechanism for a tool chuck in accordance with an example embodiment of the present invention.
Figure 18B:
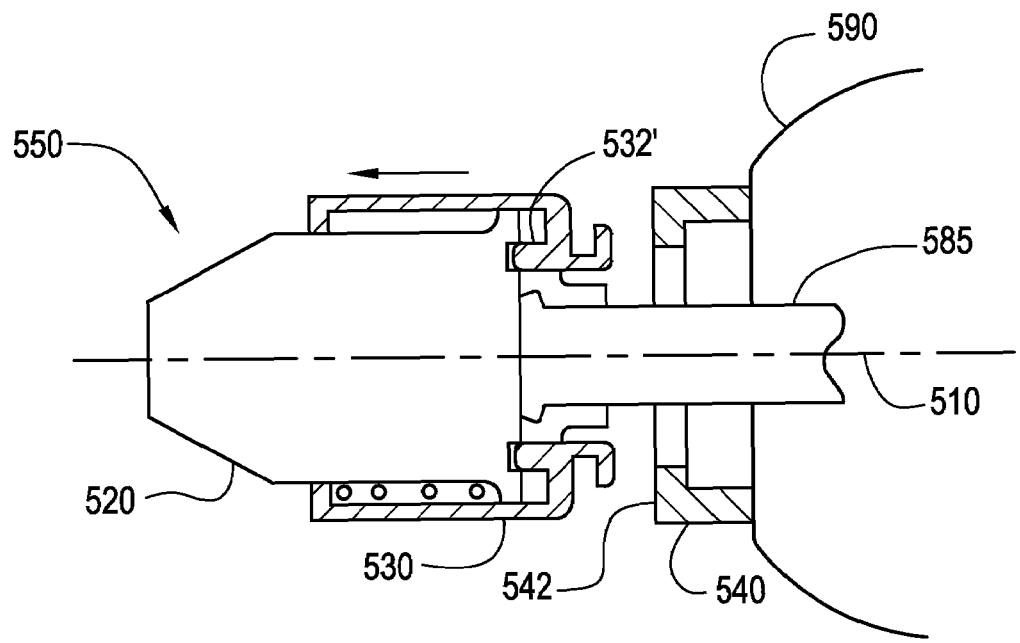

FIGS. 18A and 18B illustrate a locking mechanism for a tool chuck in accordance with an example embodiment of the present invention. The locking mechanism to be described may be applicable to any of the aforementioned tool chucks described in FIGS. 1-15 and 17A-17B which includes a chuck sleeve configured for sliding and/or axial movement. FIG. 18A illustrates a tool chuck 550 in an example 'chuck actuation mode', and FIG. 18B illustrates the tool chuck 550 locked in an example 'drilling/screwing mode'. Several features of the chuck mechanism as shown in detail in any of FIGS. 1-15, 17A and/or 17B have been removed for purposes of clarity.

Referring now to FIG. 18A, tool chuck 550 is shown with chuck body 520 attached to spindle 585. A clutch part of a front sleeve 530' may be in the form of a raised feature 532, and a clutch part of a rear sleeve 540 may be in the form of a detent 542, for example. During a chuck actuation process, and when the tool chuck 550 is not fully opened or closed, the raised feature 532 may abut against the detent 542 so that the front sleeve 530 and the rear sleeve 540 may be rotationally locked together. When the tool chuck fully closes or fully opens, a rotational force applied by the raised feature 532' to the detent 542 may increase to a threshold at which the detent 542 may be driven in a radial outward direction (causing the rear sleeve 540 to elastically deform) so that the raised feature 532 may slide underneath and past the detent 542.

Thus, once the chuck 550 has been tightened, the clutch part 532 of sleeve 530 disengages clutch part 542 of sleeve 540 and sleeve 530 and is urged forward due to compressive spring 525. However, since the rear of the chuck body 520 includes recesses 522, these recesses 522 receive a forward detent portion 532' of raised feature 532, so as to engage the detent portions 532' to prevent relative motion between the sleeve 530 and the chuck body 520. If desired, surfaces within the recesses 522 and on the detent portions 532' may have a tooth-like profile so as to facilitate engagement. Accordingly, the example locking methodology locks the chuck 550 in a relatively simple design that is automatic.

Although the corresponding shapes of the recesses 522 and detent portions 532' are shown as generally rectangular, it would be evident to one skilled in the art to fashion the shapes of the recesses and detent portions in a different shape to facilitate connective engagement as a locking mechanism.

Figure 19:
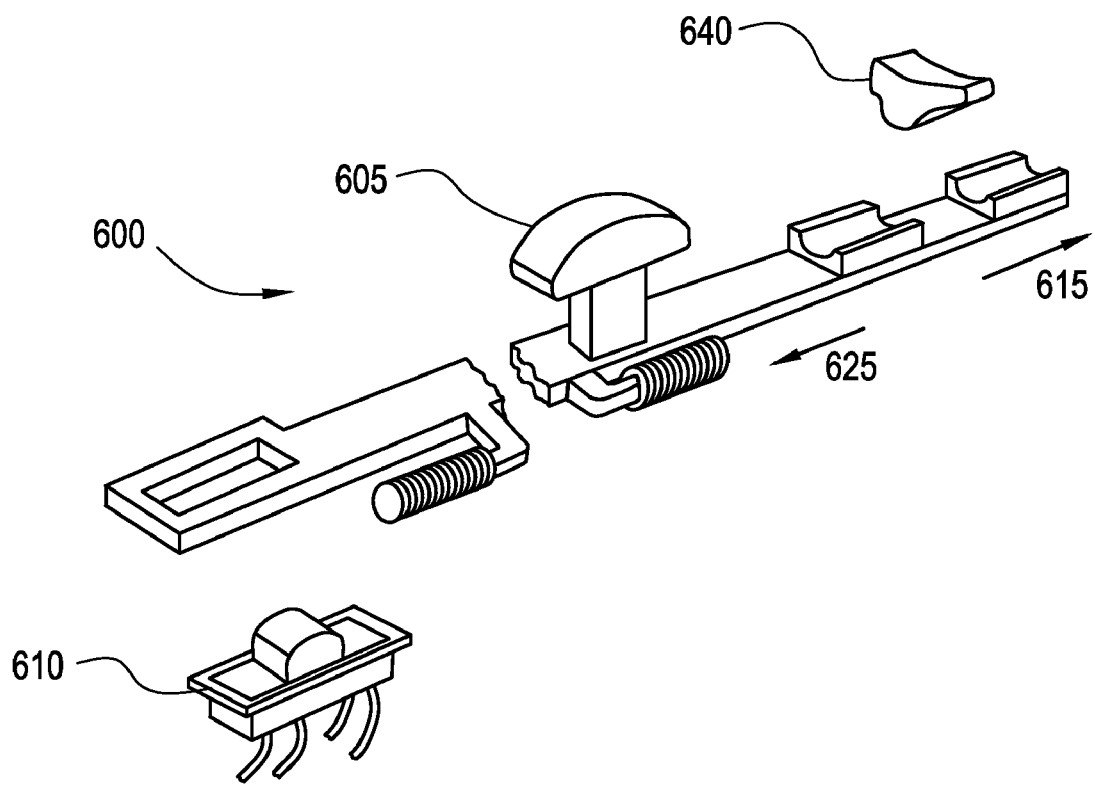
FIG. 19 illustrates a spring-loaded actuator for providing consistent tightening on an example tool chuck in accordance with an example embodiment of the present invention.

FIG. 19 illustrates a spring-loaded actuator for providing consistent tightening on an example tool chuck in accordance with an example embodiment of the present invention. Referring to FIG. 19, an example portion of a spring-loaded actuator 600 is shown, which may be adapted for inclusion as part of any of the example tool chucks (50, 150, 250, 350, etc.) shown hereinabove.

For example, an axially spring-loaded actuator 600 may operate the tool motor to loosen or tighten the chuck jaws (i.e., jaws 2, 102, 202, 302, etc.) of the tool chuck. The actuator 600 may be mechanically connected to a forward-off-reverse slide switch 610 that electrically connects the motor to the battery or line cord. Actuator 600 may also be mechanically connected to a 'tightening' sleeve, such as a portion of the outer sleeve 640 shown in FIG. 19, through any of the example clutch mechanisms described above.

To loosen the chuck jaws, the actuator 600 may be pushed forward (shown at 615) towards a tool accessory such as a drill bit. The actuator 600 first engages the clutch mechanism (not shown) and grounds the sleeve 640 to the tool housing (such as housing 90 in FIG. 1, housing 390 in FIG. 17A, etc., for example). Continued forward motion of the actuator 600 then moves the slide switch 610 to a reverse position, turning on the motor to power the jaws open.

To tighten the chuck jaws, the actuator may be pulled back (see arrow 625) away from the drill bit. The actuator 600 again engages the clutch mechanism and grounds the sleeve 640 to the tool housing 90. Continued backwards motion of the actuator moves the slide switch 610 to the forward position, turning on the motor to tighten the jaws. It is evident to one skilled in the art that the actuator 600 may be configured so that pushing the actuator 600 forward tightens the chuck jaws and pulling back the actuator 600 loosens the jaws. Further, and as described in previous example embodiments, the clutch mechanism may rotationally lock the inner and outer sleeves together until a given torque threshold is reached, upon which the clutch mechanism may give way (or slip) to prevent excessive torque from being applied to the chuck tightening mechanism. The clutch mechanism may also be configured in an effort to assure that the torque available to tighten the jaws is less than the torque available to loosen the jaws.

Although the actuator 600 shown in FIG. 19 may be embodied by a slide button 605, it is evident to one skilled in the art to use a collar, switch or other equivalent type of mechanism may be used for actuator 600.

Accordingly, use of a spring-loaded actuator 600 may provide a simple, intuitive operation, providing higher tightening and loosening torque to the tool chuck than what the user may be able to apply using conventional methodologies of gripping a keyless chuck sleeve while turning on motor. The chuck may apply consistent tightening torque, and may be configured to prevent the chuck jaws from being over-tightened. Further, the actuator of FIG. 19 may be adapted to existing tool designs without a complete re-design of the power tool transmission.

Several example clutch mechanism have been described above. The example embodiments of the present invention are not, however, limited to the specific details of the disclosed example clutch mechanisms. Numerous and varied modifications of the clutch mechanisms may become readily apparent to those skilled in the art.

For example, the respective locations of the cooperating clutch parts may be reversed. For example, and with respect to the clutch mechanisms depicted in one or more of FIGS. 2-4, the clutch parts provided on the front sleeve may instead be provided on the rear sleeve, and the clutch parts provided on the rear sleeve may instead be provided on the front sleeve. Similarly, and with respect to the clutch mechanisms depicted in one or more of FIGS. 7-9, 11, 12, 14 and 15, the clutch parts provided on the rear sleeve (or outer sleeve) may instead be provided on the housing, and the clutch parts provided on the housing may instead be provided on the rear sleeve (or outer sleeve).

Additionally, the clutch parts are not limited to the specific geometrical shapes illustrated in one or more of FIGS. 2-4, 7-9, 11, 12, 14 and 15. In this regard, numerous and alternative shapes may be implemented. For example, the clutch parts may have symmetrical or asymmetrical shapes. The working surfaces of the clutch parts may be planar and/or curved. The cooperating clutch parts may have working surfaces with complementary profiles or different profiles. Further, the example embodiments of the present invention are not limited to a specific number of clutch part elements. For example, a clutch part may include one or more detents, arms, raised features, etc. When a clutch part includes more than one clutch part element, it may be desirable to uniformly space the clutch part elements around the axis of the tool chuck, but the example embodiments of the present invention are not limited in this regard. Also, the number of clutch part elements of one clutch part may or may not equal the number of clutch part element of the cooperating clutch part.

We claim:

1. A tool chuck comprising: a chuck body defining a longitudinal axis; a sleeve mounted on the chuck body, such that the sleeve is rotatable relative to the chuck body and axially fixed in position relative to the chuck body; and a clutch part provided on the sleeve, the clutch part having a working surface to selectively frictionally engage with a cooperating clutch part, the working surface facing in a direction that is perpendicular to the longitudinal axis.

2. The tool chuck as set forth in claim 1, further comprising:

a nut fixed to the sleeve; and a plurality of jaws screw coupled to the nut.

3. The tool chuck as set forth in claim 1, further comprising:

a spring that biases the cooperating clutch part away from the clutch part provided on the sleeve.

4. The tool chuck as set forth in claim 1, wherein the cooperating clutch part is mounted on a power driver housing, such that the cooperating clutch part is rotationally fixed to the power driver housing and axially moveable relative to the power driver housing.

5. The tool chuck as set forth in claim 1, wherein the clutch part has a ramped profile for driving the cooperating clutch part in a direction perpendicular to the longitudinal axis.

6. A power driver comprising: a housing; a tool chuck mounted for rotation relative to the housing, the tool chuck including a chuck body defining a longitudinal axis, a sleeve mounted on the chuck body, such that the sleeve is rotatable relative to the chuck body and axially fixed in position relative to the chuck body, and a clutch part provided on the sleeve; and a cooperating clutch part provided on the housing for movement relative to the housing between a first axial position in which the sleeve is rotatable with the chuck body, and a second axial position in which the cooperating clutch part engages with the clutch part provided on the sleeve, and wherein the clutch part has a ramped profile for driving the cooperating clutch part in a direction perpendicular to the longitudinal axis.

7. The tool chuck as set forth in claim 6, wherein the sleeve is positioned axially in front of the cooperating clutch part.

8. The tool chuck as set forth in claim 6, further comprising:
   a spring that biases the cooperating clutch part toward the first axial position.

9. The tool chuck as set forth in claim 8, wherein the spring is captured between the chuck body and the cooperating clutch part.

10. The tool chuck as set forth in claim 6, wherein the cooperating clutch part is a latch pawl mounted in a clutch mechanism housing, the latch pawl being elastically biased in a radial outward direction.

11. A power driver comprising:
   a housing;
   a linkage provided on the housing and connected to a power switch; and
   a tool chuck provided on the housing, the tool chuck having a chuck body; and
   a sleeve mounted on one of the chuck body and the housing, the sleeve supporting a clutch part, the sleeve being moveable relative to the housing between
      a first axial position in which the clutch part engages with a cooperating clutch part and the sleeve moves the linkage to actuate the power switch, and
      a second axial position in which the clutch part disengages from the cooperating clutch part.

12. The power driver as set forth in claim 11, wherein the linkage provides a mechanical connection between the sleeve and the power switch.

* * * * *